Figure 3:
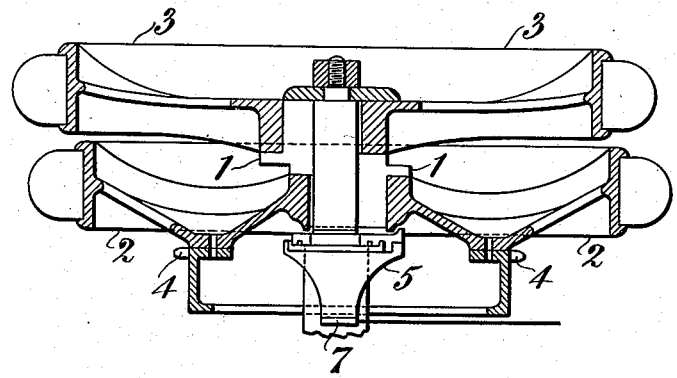

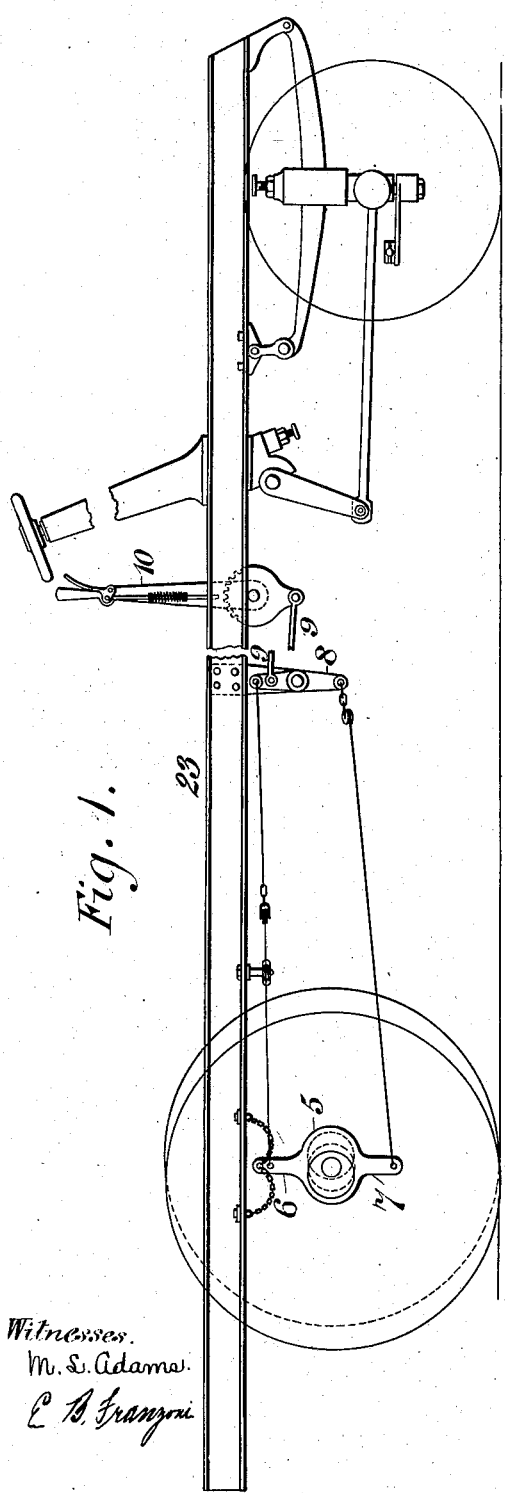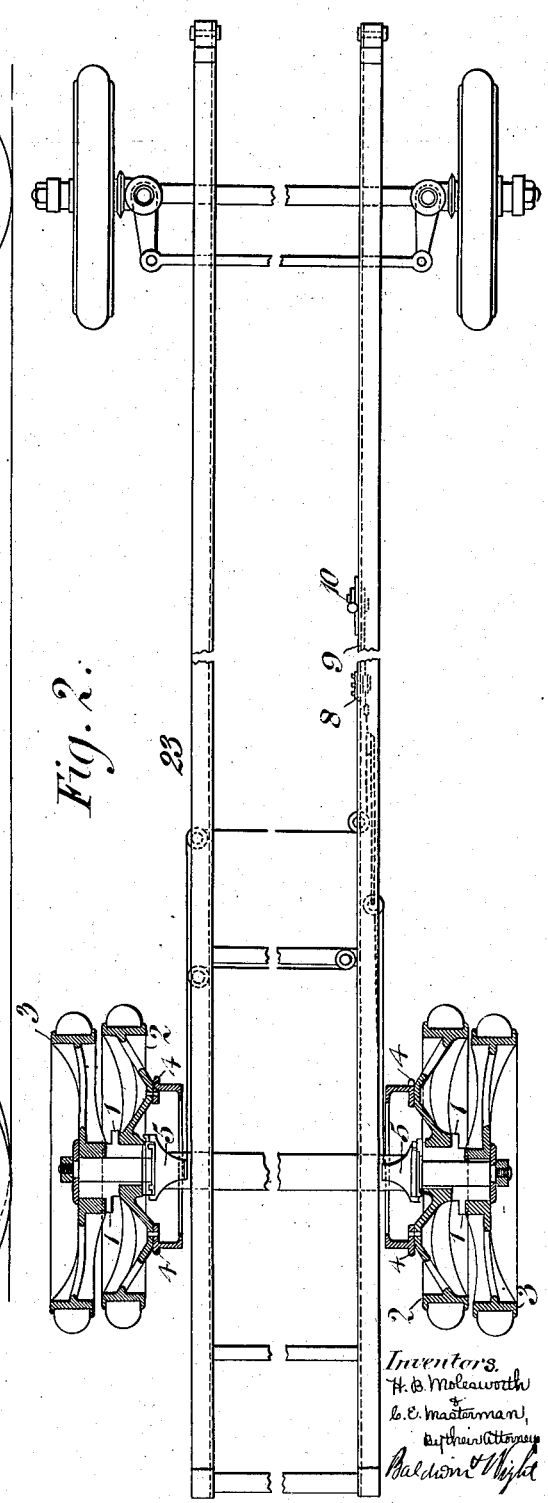

H. B. MOLESWORTH & C. E. MASTERMAN.
MOTOR DRIVEN VEHICLE.
APPLICATION FILED NOV. 14, 1907.

907,847.

Patented Dec. 29, 1908.
3 SHEETS—SHEET 2.

Witnesses
M. Lilian Adams.
C. F. Early.

Inventors.
H. B. Molesworth & C. E. Masterman,
By their Attorneys,
Baldwin Wight.

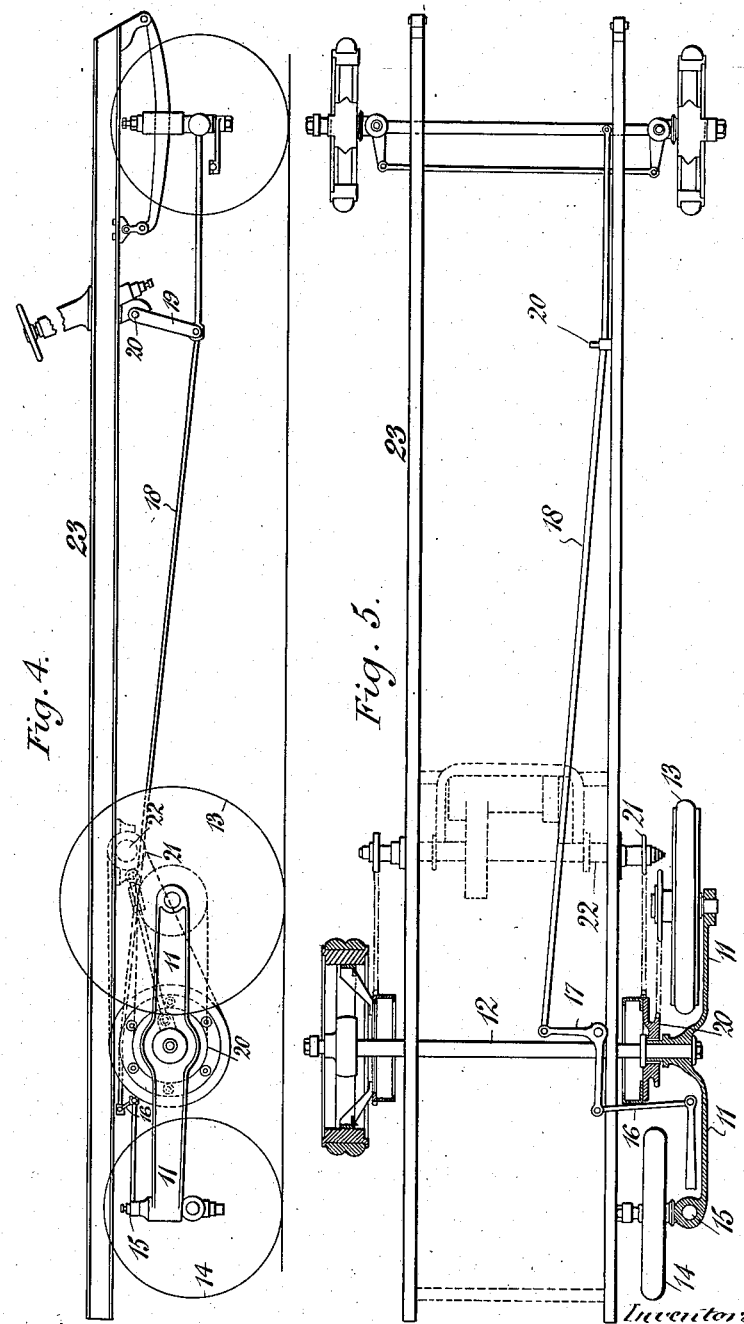

UNITED STATES PATENT OFFICE.

HENRY BRIDGES MOLESWORTH AND CHARLES EDWARD MASTERMAN, OF LONDON, ENGLAND.

MOTOR-DRIVEN VEHICLE.

No. 907,847.   Specification of Letters Patent.   Patented Dec. 29, 1908.

Application filed November 14, 1907. Serial No. 402,203.

*To all whom it may concern:*

Be it known that we, HENRY BRIDGES MOLESWORTH and CHARLES EDWARD MASTERMAN, subjects of the King of Great Britain, residing, respectively, at 39 Victoria street and 28 Victoria street, London, England, engineers, have invented new and useful Improvements in Motor-Driven Vehicles, of which the following is a specification.

Motor vehicles as at present constructed are for the most part mounted upon two transverse axles one at the front and the other at the rear a steering wheel being mounted on each end of the front axle and a driving wheel on each end of the rear axle. It has also been proposed to mount the vehicle on three transverse axles one below each end of the vehicle carrying steering wheels at their ends and the third one below the center of the vehicle and carrying driving wheels on its ends and in addition it has been proposed to couple the ends of each end axle to the ends of the central axle by longitudinally disposed compensating levers or to couple the ends of the central axle to the ends of the rear axle only by longitudinal compensating levers.

According to this invention, in place of mounting the three pairs of wheels on the ends of three transverse axles and coupling the ends of one or both of the end axles to the ends of the central axle by longitudinal compensating levers mounted on other transverse axles, we provide two axles only which extend across from one side of the vehicle to the other and we mount upon one or both ends of one of these axles a longitudinal compensating lever which at each of its ends has a short stud or pin projecting sidewise from it upon each of which a wheel is mounted. Thus in place of there being five or four axles extending below the body from one side of the vehicle to the other, as in the two last arrangements above referred to, there are two axles only extending from one side to the other of the vehicle and the longitudinal compensating lever on one side of the vehicle is entirely independent of any other compensating lever on the opposite side of the vehicle and no sidewise or other strains can be brought upon it by reason of its being coupled to any other compensating lever.

Each longitudinal compensating lever may either be very short in which case the short pins or studs on which the wheels turn would form two eccentrics side by side on a sleeve or boss mounted on the end of the axle, the two wheels then being side by side one slightly in rear of the other—or the compensating lever may be longer so that one wheel is in front of the other—in this case the rearmost wheel may be steered in conjunction with the steering wheels on the front axle.

Figure 1 is a side elevation and Fig. 2 a plan of the arrangement when a short compensating lever is used. Fig. 3 is a section on a larger scale of one of the compensating levers and wheels mounted upon it. Fig. 4 is a side elevation and Fig. 5 a plan of an arrangement in which a longer compensating lever is used.

In Figs. 1, 2 and 3 the short compensating lever is marked 1 and consists of a bush free to turn on the end of the axle and having side by side upon it two eccentrics extending in opposite directions. 2 and 3 are wheels mounted on the two eccentrics. The inner wheel 2 is arranged to be the driving wheel and is formed with a chain or sprocket wheel 4, the cylindrical portion of this wheel serves as a brake drum in the ordinary way. The wheel 3 is left free. 5 is a plate secured to the inner face of the eccentric bush, an arm 6 extending upwards from it is connected by chains extending from it in opposite directions to two points of the frame of the vehicle to limit the amount of movement of the bush around the axle. In the drawings we have also shown means for increasing or decreasing the pressure on the driving wheel as it is found that when driving forwards the pressure upon the driving wheel is increased but when driving backwards is decreased. To effect this we form the plate 5 with another arm 7 extending downwards from it and we couple the arms 6, 7 by cords or connections to the opposite arms of a lever 8 which is itself connected by a link 9 to a hand lever 10. Thus whenever it is desired to cause any one or other of the wheels to have a greater proportion of weight put upon it the lever can by hand be pressed forwards or backwards according as more or less weight is to be put on one or other wheel.

In Figs. 4 and 5 the compensating lever is formed of lever arms 11 projecting forwards and rearwards from a bush which is free to turn on the axle 12. A compensating lever of this kind is shown as being mounted on one end only of the axle while a driving wheel is mounted in the ordinary way upon the other end of the axle but if desired this wheel also may be replaced by a compensating lever. The driving wheel 13 is mounted on a pin projecting out from the forward end of the lever while the free wheel 14 is mounted on a pin or axle which projects out from a vertical spindle 15 coupled to the rear end of the lever so as to allow of the wheel being steered in conjunction with the ordinary front steering wheels of the vehicle. To steer the rear wheel 14 in conjunction with the front steering wheels an arm on the vertical spindle 15 is as shown coupled by a link 16 to one arm of a bell crank lever 17 the other arm of which is connected by a rod 18 with an arm 19 on an axis 20 to which a turning motion can be given from a steering wheel in the ordinary way and from which motion is also given in the ordinary way to the vertical axis of one of the front steering wheels. In place of the steering arm on the spindle 15 and the crank lever being above the axle as shown they might if preferred be both below the axle. The driving wheel 13 may be driven in any suitable manner. In the drawing it is shown as being driven by an endless chain from a chain wheel 20 which is free to turn on the axle—this wheel being itself driven by another endless chain from a chain wheel 21 on one end of a driving shaft 22. This shaft may extend across the vehicle and as usual be divided into two lengths coupled by compensating or differential gear and be driven from the change speed gear used in connection with the motor. If preferred the wheel 20 might be fast with the axle and the axle be driven by bevel or worm gearing or the wheel 20 might be driven by spur wheel gear. 23 is the body framework of the vehicle.

What we claim is:

1. A motor driven vehicle in which the body has two axles only extending below it and in which one of these axles has a longitudinal compensating lever mounted to move on one or both of its ends and a wheel mounted on a short stud projecting sidewise from each end of the lever.

2. In a motor driven vehicle the combination of a body frame mounted on two transverse axles only one at the front the other at the rear, a steering wheel mounted at each end of the front axle, a longitudinal compensating lever on one or both ends of the rear axle, a wheel mounted on a pin or stud projecting sidewise from the forward end of this lever, means for driving this wheel, a vertical spindle mounted at the rear end of the lever, a pin or axle projecting sidewise from this spindle and having a wheel mounted upon it and means for steering this wheel in conjunction with the steering wheels at the ends of the front axle.

HENRY BRIDGES MOLESWORTH.
CHARLES EDWARD MASTERMAN.

Witnesses:
F. L. RAND,
H. D. JAMESON.